United States Patent [19]

Nakano et al.

[11] Patent Number: 5,568,278
[45] Date of Patent: Oct. 22, 1996

[54] IMAGE DATA CODING AND DECODING METHOD AND APPARATUS WITH A PLURALITY OF DCT'S, QUANTIZERS, AND VLC'S

[75] Inventors: Keiichi Nakano; Hidetoshi Yamada, both of Tokyo, Japan

[73] Assignee: Olympus Optical Co., Ltd., Tokyo, Japan

[21] Appl. No.: 170,676

[22] Filed: Dec. 20, 1993

Related U.S. Application Data

[63] Continuation-in-part of Ser. No. 842,055, Feb. 26, 1992, abandoned.

[30] Foreign Application Priority Data

Mar. 19, 1991 [JP] Japan ................................. 3-054936

[51] Int. Cl.⁶ ............................................... H04N 1/41
[52] U.S. Cl. ......................... 358/427; 358/433; 358/261.1; 348/397
[58] Field of Search ........................... 348/397, 411; 358/433, 426, 427, 432, 261.1, 261.2, 261.3, 261.4

[56] References Cited

U.S. PATENT DOCUMENTS

| | | | |
|---|---|---|---|
| 4,293,920 | 10/1981 | Merola | 358/133 |
| 5,021,891 | 6/1991 | Lee | 358/433 |
| 5,073,820 | 12/1991 | Nakagawa et al. | 358/133 |
| 5,130,797 | 7/1992 | Murakami et al. | 358/133 |
| 5,379,070 | 1/1995 | Retter et al. | 348/403 |

Primary Examiner—Scott A. Rogers
Assistant Examiner—Thomas L. Stoll
Attorney, Agent, or Firm—Frishauf, Holtz, Goodman, Langer & Chick

[57] ABSTRACT

An image data coding device includes a plurality of orthogonal transform circuits for subjecting a plurality of image data items divided into blocks to the orthogonal transform. A plurality of quantization circuits quantize the orthogonal transform outputs supplied from the plurality of orthogonal transform circuits for each frequency component. A plurality of variable length coding circuits subjects the quantized outputs supplied from the plurality of quantization circuits to the variable length coding process. A plurality of memory circuits store outputs of the plurality of variable length coding circuits in a bit-series configuration. An output circuit reads out bit-series data items stored in the plurality of memory circuits by turns, connecting the readout data items together and outputting the data for each byte.

11 Claims, 7 Drawing Sheets

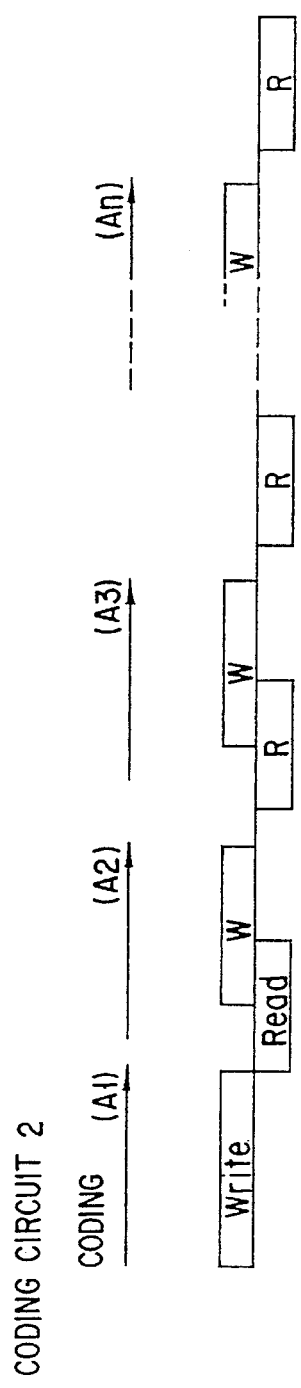
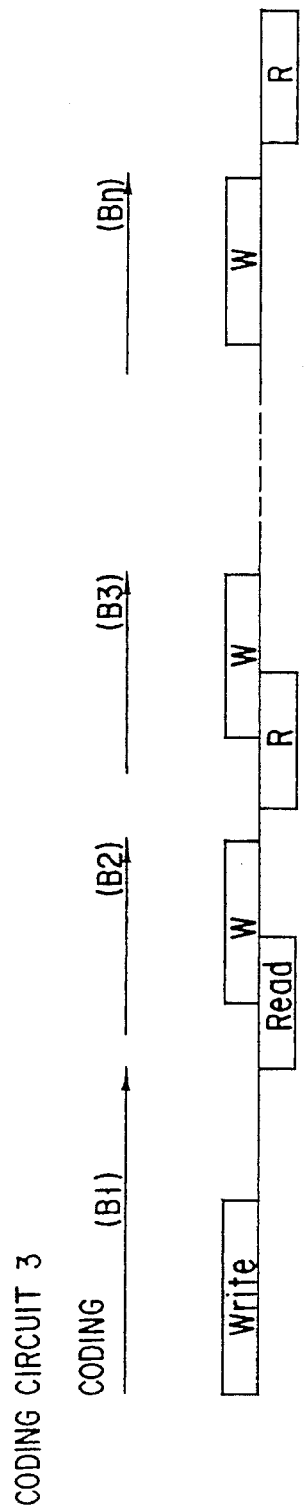

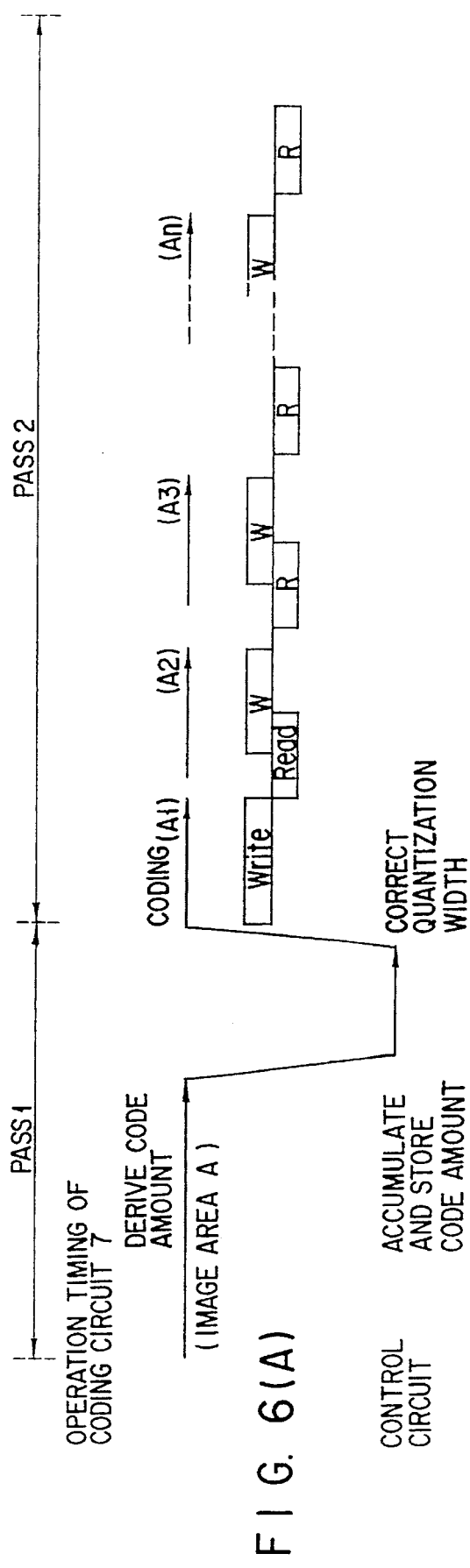
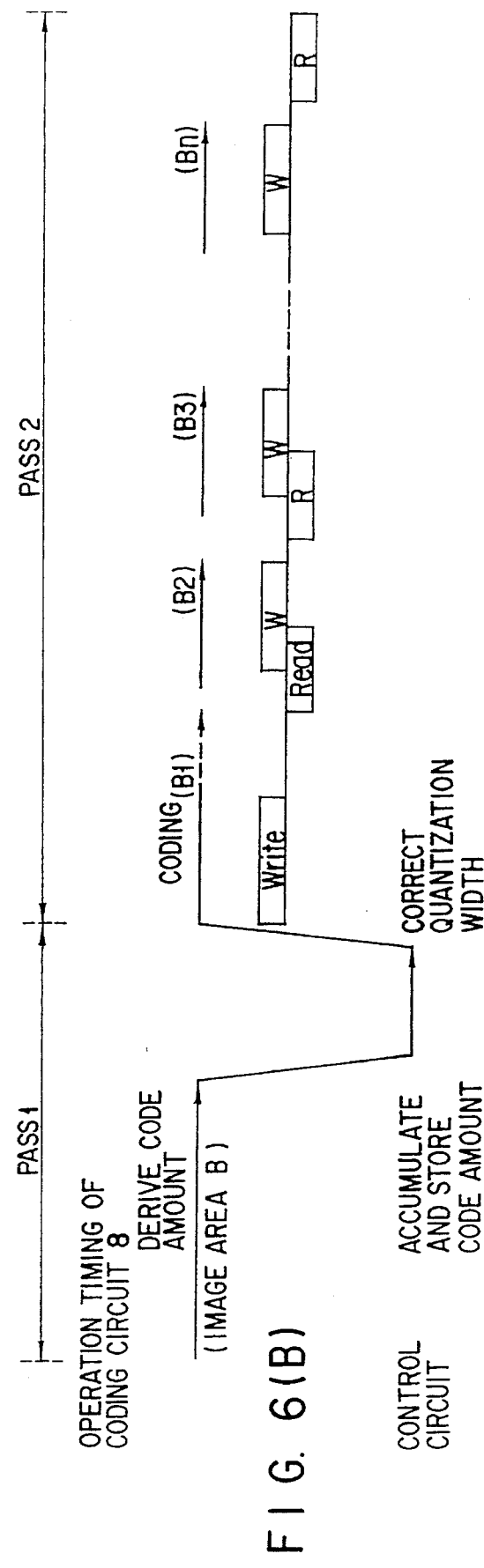
FIG. 6(A)
FIG. 6(B)

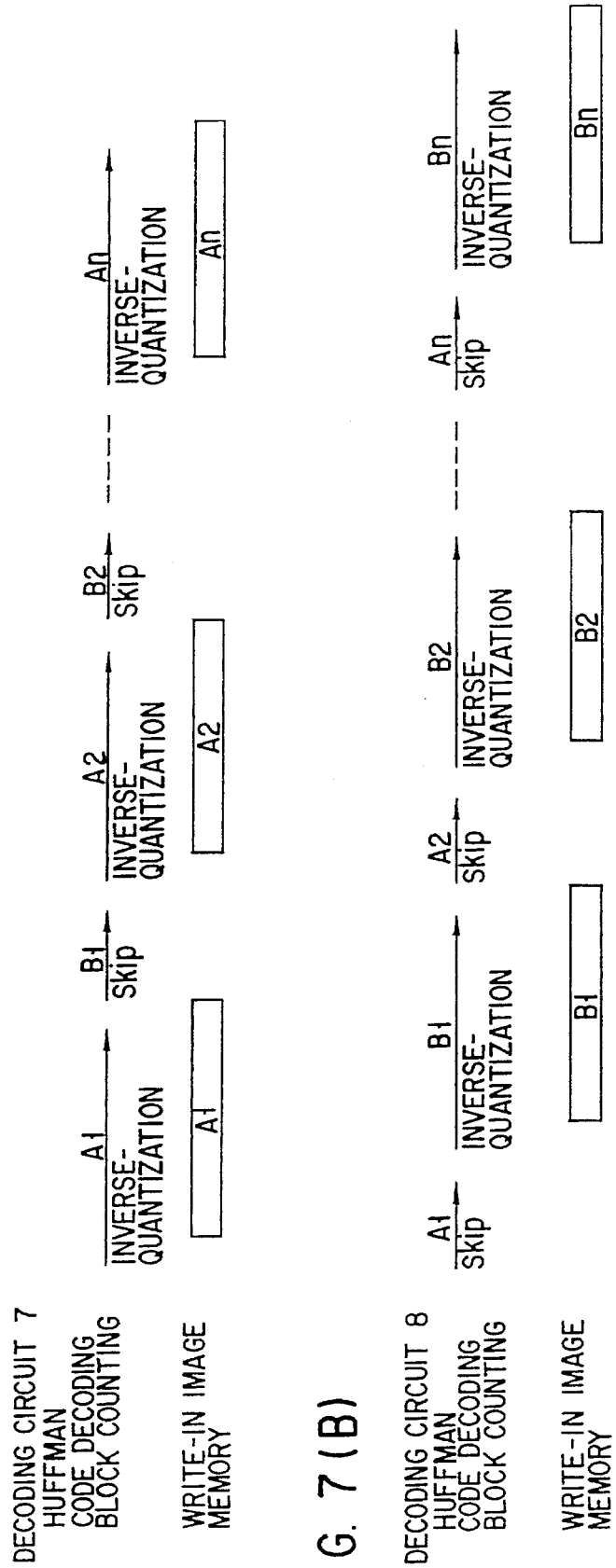

IMAGE DATA CODING AND DECODING METHOD AND APPARATUS WITH A PLURALITY OF DCT'S, QUANTIZERS, AND VLC'S

This application is a Continuation-In-Part, of application Ser. No. 07/842,055, filed Feb. 26, 1992, abandoned.

BACKGROUND OF THE INVENTION

1. Field of the Invention

This invention relates to coding and decoding devices for effecting high-compression coding of image data.

2. Description of the Related Art

When an image signal is stored into a memory device such as a memory card, magnetic card or magnetic tape as digital data, or when an image signal is transmitted or received by means of an image communication system, the amount of data to be handled is extremely large so that data of the image signal must be subjected to some high-efficiency compression in order to store or receive/transmit a large number of frame images with a limited memory capacity.

Further, time taken for effecting the data recording/reproducing process must be made short in a digital electronic still camera or the like. The same requirement must be met when moving picture images are recorded in a digital VTR (video tape recorder), digital animation film or the like. That is, time required for effecting the data recording/reproducing process must be made short irrespective of still picture images or moving picture images.

A coding method made up by combining the orthogonal transform coding and the variable length coding is widely known as a high-efficiency image data compression system. A typical example of the method is studied for the still image coding international standardization. This method is schematically explained below.

First, image data is divided into blocks of preset size and then subjected to the 2-dimensional DCT (discrete cosine transform) for the orthogonal transform for each of the divided blocks. Then, the linear quantization is effected according to the respective frequency components and the thus quantized values are subjected to the Huffman coding for the variable length coding. At this time, the DC component is processed such that a difference between the DC component of a block and the DC component of the neighboring block is subjected to the Huffman coding. The AC component is subjected to the 2-dimensional Huffman coding by effecting a so-called zig-zag scanning in a frequency range from the low-frequency component to the high-frequency component and detecting the number of consecutive invalid (the value is 0) components and the value of the valid component succeeding the sequence of invalid components.

The above operation is described in detail with reference to FIG. 8. First, as shown in (a), image data of one frame is divided into blocks of preset size (for example, blocks A, B, C, . . . of 8×8 pixels) and then subjected to the 2-dimensional DCT (discrete cosine transform) for the orthogonal transform for each of the divided blocks and sequentially stored on 8×8 matrices.

When viewing the image data in the 2-dimensional plane, it contains the spatial frequency which is frequency data corresponding to the distribution of light and shade information items. Therefore, by effecting the above DCT, the image data is converted into the DC component DC and AC component AC, and data indicating the value of the DC component DC is stored on the origin (0, 0) of the 8×8 matrix, data indicating the maximum frequency value of the AC component AC in the abscissa direction is stored on the position (0, 7), data indicating the maximum frequency value of the AC component AC in the ordinate direction is stored on the position (7, 0), and data indicating the maximum frequency value of the AC component AC in the oblique direction is stored on the position (7, 7). In each of the intermediate positions of the matrix, frequency data having a higher frequency component is stored as the coordinate position thereof becomes farther from the origin in the above directions.

Next, the linear quantization for each frequency component is effected by dividing the stored data in each of the coordinate position of the matrix by the quantization width of each frequency component (c), and the thus quantized value is subjected to the Huffman coding for the variable length coding. At this time, the DC component DC is processed such that a difference between the DC component of a block and the DC component of the neighboring block is expressed by a group number (the number of an additional bit) and an additional bit, the group number is subjected to the Huffman coding, and the coding word derived by effecting the Huffman coding and the additional bit are combined to construct coding data (d1, d2, e1, e2).

The AC component AC of a valid factor (the value is not "0") is also expressed by a group number and an additional bit. The AC component AC is subjected to the 2-dimensional Huffman coding by effecting a so-called zig-zag scanning in a frequency range from the low-frequency component to the high-frequency component and detecting the number (the run number of "0") of consecutive invalid (the value is 0) components and a group number of the value of a valid component succeeding the sequence of invalid components, and the thus derived coding word and the additional bit are combined to construct coding data.

In the Huffman coding, data is coded to construct a code word by assigning a least number of data bits to those of the DC and AC frequency components which have the peak frequency of occurrence for each frame image in the data distribution, and assigning a larger number of data bits to the frequency components farther from the peak portion. The above operation is the basic part of the coding system.

With only the above basic part, the code amount becomes nonuniform for each image since the Huffman coding which is the variable length coding is used. Therefore, the inventors of this application proposed the following method as a method of controlling the code amount in the Japanese Patent Application No. 2-137222.

In the data compression system constructed by combining the orthogonal transform and the variable length coding, in order to control the generated code amount, an image signal stored in the memory is divided into blocks and subjected to the orthogonal transform for each of the divided blocks, and then the transformed output is quantized by use of a provisional quantization width, the quantized output is subjected to the variable length coding, the generated code amount for each block and the total generated code amount for the entire image are derived and a new quantization width is estimated from the provisional quantization width, the total generated code amount and a desired total code amount (first pass). After this, the image signal in the image memory is sequentially subjected to the block division, orthogonal transform, quantization and variable length coding by use of the new quantization width, and a code amount assigned for each block is derived based on the total generated code amount and the generated code amount for each block in the first pass and the desired total code amount. If the generated code amount of each block exceeds the code amount assigned to each block, the variable length coding is interrupted on the half way and the process for the next block is started (second pass). Thus, the above system is designed to control the code amount so that the total generated code amount of the entire image will not exceed the desired preset code amount.

As described before, it is desired that the image data compression can be effected with high efficiency in the case of the image recording and reception/transmission. In order to meet the above requirement, the above-described international standardization system is provided, and in this system, image data compression can be effected with high efficiency by use of a method which is a combination of the variable length coding and the orthogonal transform for each block, but since the data compression procedure is complicated, time for the process will become long. In general, since the processing time for the data compression varies in proportion to the number of pixels of an image, a fully satisfied result can be obtained in that the code amount can be made uniform by use of the system proposed in the Japanese Patent Application No. 2-137222 (corresponding to U.S. Pat. No. 5,073,820 issued Dec. 17, 1991) for attaining extremely high resolution, but since two passes are used for the coding, the processing time will be made further long. It is necessary to shorten the processing time from the viewpoint of the operability and power consumption in the image recording and transmission devices.

SUMMARY OF THE INVENTION

Accordingly, an object of this invention is to provide an image data coding and decoding device capable of coding a large amount of image data in a short period of processing time by effecting the parallel processing.

In order to attain the above object, an image data coding device provided as the first aspect of this invention comprises a plurality of orthogonal transform circuits for subjecting a plurality of image data items divided into blocks to the orthogonal transform; a plurality of quantization circuits for quantizing the orthogonal transform outputs from the plurality of orthogonal transform circuits for each frequency component; a plurality of variable length coding circuits for subjecting the quantized outputs from the plurality of quantization circuits to the variable length coding; a plurality of memory means for storing outputs of the plurality of variable length coding circuits in a bit-series configuration; and output means for reading out bit-series data stored in the plurality of memory means by turns, connecting the readout data items together and outputting the data for each byte.

Further, an image data decoding device provided as the second aspect of this invention comprises a plurality of variable-length code decoding circuits for decoding quantized values of DC and AC components of image data which has been subjected to the variable length coding; a block counting circuit for detecting blocks to be inverse-quantized based on the DC and AC components decoded by the plurality of variable-length code decoding circuits; a plurality of inverse-quantizing circuits for inverse-quantizing the DC and AC components of the blocks detected by the block counting circuit; and a plurality of inverse-orthogonal transform means for subjecting the DC and AC components of the blocks inverse-quantized by the plurality of inverse-quantizing circuits to the inverse-orthogonal transform for each block.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B are operation timing diagrams for illustrating the operation of the coding device shown in FIG. 1;

FIGS. 6A and 6B are operation timing diagrams for illustrating the operation of the coding device shown in FIG. 5;

FIGS. 7A and 7B are operation timing diagrams for illustrating the decoding operation of the decoding device shown in FIG. 5.

DETAILED DESCRIPTION OF THE PREFERRED EMBODIMENTS

The basic concept of a preferred embodiment of this invention is to improve the processing speed by operating a plurality of coding devices which can be independently operated in parallel. For example, coding circuits are formed in an integrated circuit (IC) configuration, and the number of coding circuits is determined according to the construction of an instrument which requires the coding devices. An instrument which is of small scale and in which great importance is put on low cost may use a single coding circuit and an instrument which is of large scale and in which great importance is put on performance may use a large number of coding circuits.

Figure 4A:
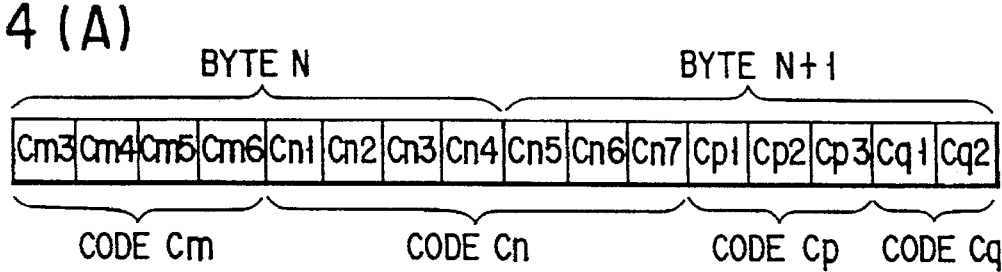
FIGS. 4A and 4B are diagrams showing the structures of code data.

When a plurality of coding circuits are used, the following points must be taken into consideration. That is, in the data compression system of the international standard specification, variable-length codes for the quantized DC or AC components are arranged without any gap therebetween and separated for every 8 bits (one byte) to derive code data. In each of the thus segmented bytes variable-length codes are arranged without any gap therebetween, and a certain variable-length code is separated on the half way and the former and latter parts thereof are set into the two successive bytes, respectively (refer to FIG. 4A).

Figure 4B:
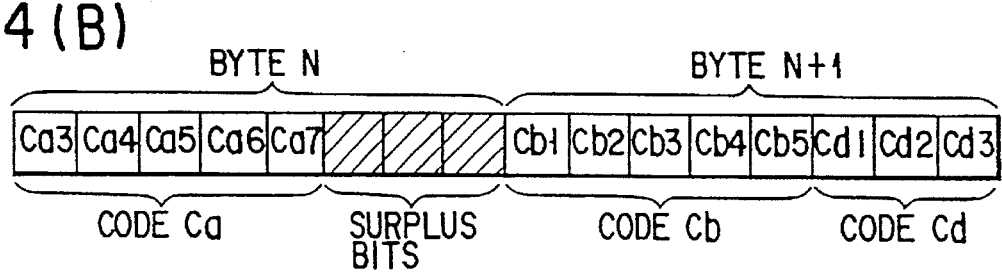

In a case where the divided image data items are coded by a plurality of coding circuits and the segment of the byte does not coincide with the end of the code when the data items for each output byte are simply connected together, surplus bits will occur as shown in FIG. 4B. If they are left as they are, the surplus bit series is interpreted as an erroneous code in a decoding operation and a correct coding cannot be attained. Further, in the data compression system of the international standard specification, a special code for separating the code data is used as a means for permitting the above division. However, the special code used for indicating the separation is a redundant code which is not directly associated with the image. In addition, since it is necessary to separate the data for each byte in order to detect the presence of the special code, an additional redundant code must be used.

In this invention, the above problems are taken into consideration, and code data items output from the coding circuits are output in the form of serial bit series and separated for each byte after they are connected together. As a result, correct code data can be derived without use of redundant codes by the parallel processing.

Figure 1:
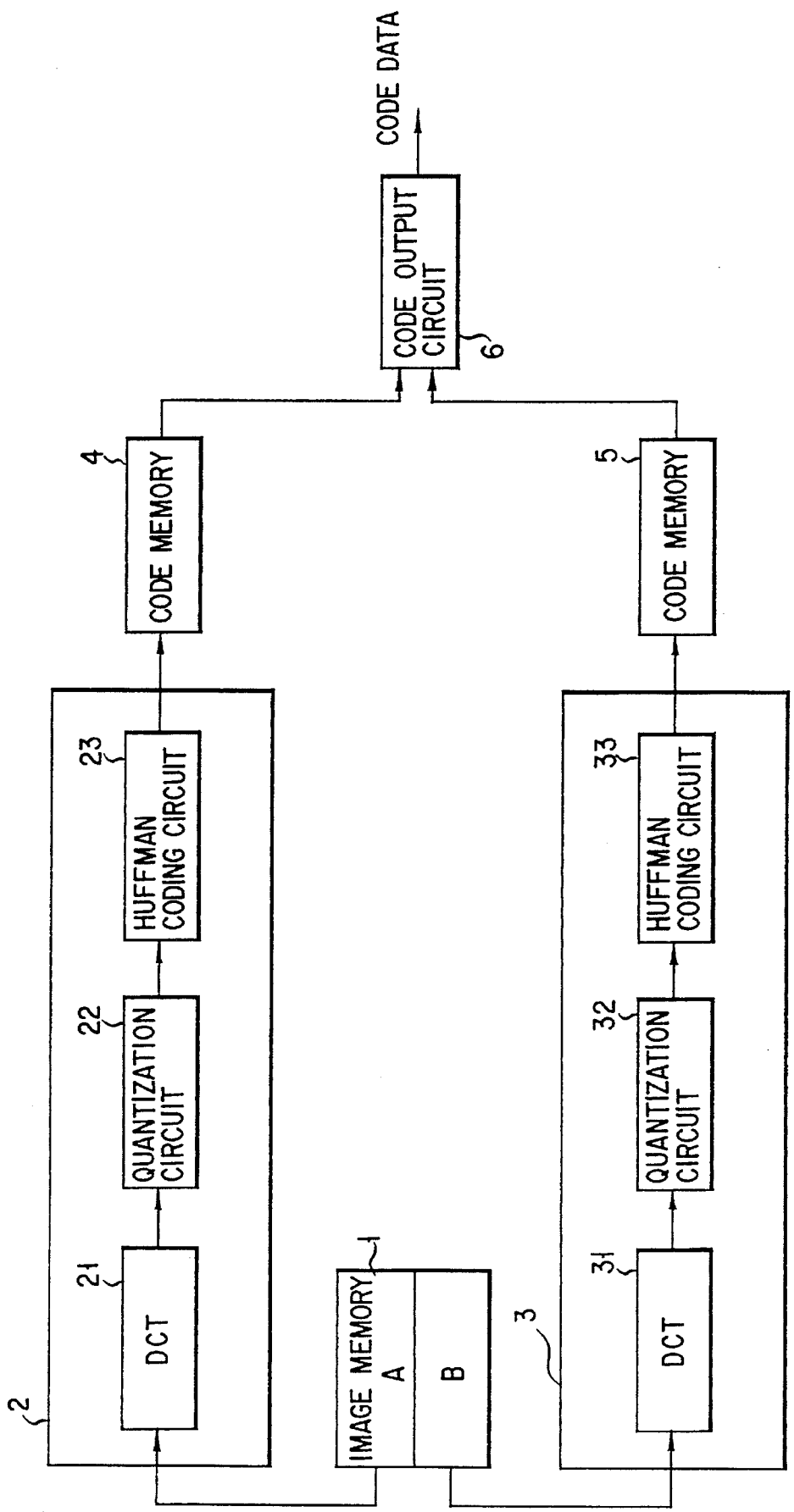
FIG. 1 is a circuit construction diagram of a coding device according to a first embodiment of this invention.

The first embodiment of this invention is explained with reference to the accompanying drawings below. This embodiment is an example in which the parallel processing is effected by use of two sets of coding circuits and the circuit construction for effecting this operation is shown in FIG. 1. In FIG. 1, a coding device of this invention includes an image memory 1 constructed by a random access memory RAM, coding circuit 2, coding circuit 3, code memory 4, code memory 5 and code output circuit 6. The coding circuit 2 includes a DCT circuit 21, quantizing circuit 22 and Huffman coding circuit 23. The coding circuit 3 has the same construction as the coding circuit 2 and includes a DCT circuit 31, quantizing circuit 32 and Huffman coding circuit 33. The code memories 4 and 5 are each constructed by a first-in first-out (FIFO) memory.

Figure 3:
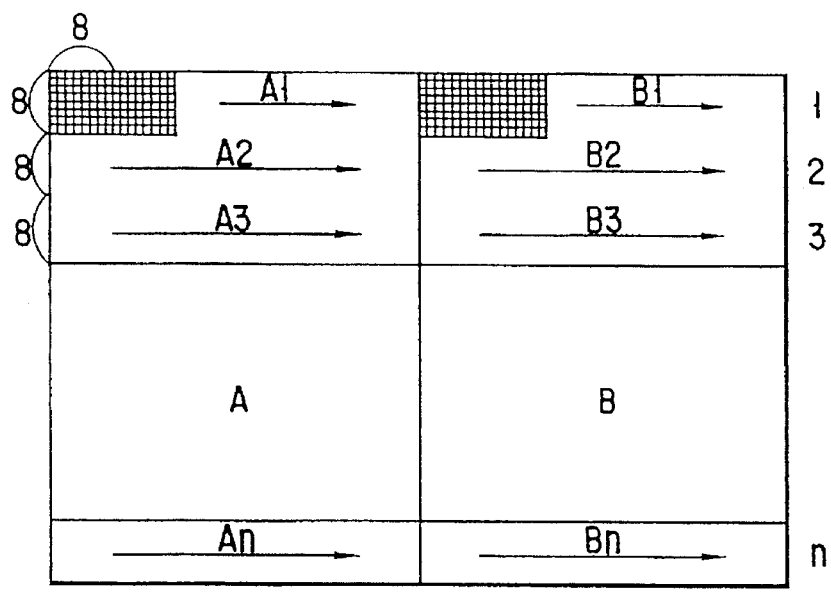
FIG. 3 is a diagram showing the array of image data to be coded.

Next, the operation timing at the time of coding operation is explained with reference to FIGS. 2A and 2B. The image memory 1 is divided into areas A and B and corresponding portions of a left half section A and a right half section B of an image divided as shown in FIG. 3 are stored into the respective memory areas. The memory areas are constructed so as to permit signals to be independently read out therefrom.

when the coding operation is started, a signal A1 of first to eighth lines and a signal B1 of first to eighth lines are respectively read out from the memory areas A and B of the image memory 1 and respectively input to the coding circuits 2 and 3. In this case, signals are sequentially read out for each block of 8×8 pixels by the memory address control at the time of readout operation.

The readout signal A1 is converted into a DCT coefficient by the DCT circuit 21. The thus converted coefficient is subjected to the linear quantization with a quantization width determined for respective frequency components in the quantization circuit 22. The quantized value is input to the Huffman coding circuit 23. A difference between the DC component and the DC component of a preceding block is expressed by a group number and an additional bit and the group number is subjected to the Huffman coding process. The AC component thereof is subjected to the 2-dimensional Huffman coding by effecting the zig-zag scanning and detecting the number (zero-run) of consecutive invalid components and the group number of the value of a valid component succeeding the sequence of invalid components. The additional bit and the code word whose DC and AC components have been determined are combined to constitute code data. The thus obtained code data is written from the coding circuit 2 into the code memory 4 for each bit as a consecutive serial signal. At this time, an end-of-block (EOB) code is added to a block in which a 64-th (AC maximum frequency) coefficient is not present.

Likewise, the signal B1 is coded in exactly the same manner as described above by means of the DCT circuit 31, quantization circuit 32 and Huffman coding circuit 33 of the coding circuit 3 and derived data is written into the code memory 5.

Data items stored in the code memories 4 and 5 are read out and supplied to the code output circuit 6. In this case, the readout operation is alternately effected for the memories 4 and 5 and the readout operation for the code memory 4 is first effected. After the readout operation for the code memory 4 is completed, the readout operation for the code memory 5 is effected. In the code output circuit 6, the code data items are processed as a sequence of connected bit series. That is, the code data items are sequentially divided for every 8 bits (for each byte), and the processings such as insertion of a marker code (control code), bit stuffing (setting a bit "1" on the remainder position) and byte stuffing (when a byte is "FF", setting "00" after the byte) are effected as required and then the code data items are output as code data.

At this time, in the code output circuit 6, the code indicating variation in the DC component in the boundary region between the areas A and B is changed from a code corresponding to a difference with respect to "0" to a code corresponding to a difference with respect to the DC component in the preceding block. As is clearly seen from FIG. 2, while the code output circuit 6 waits for the code data of B1 to be read out from the code memory 5, the signal A2 (ninth to sixteenth lines of the area A) is sequentially read out from the image memory 1 for each block, input to the coding circuit 2 and subjected to the coding process as described before. The code data of A2 is written when an available area occurs in the coding memory 4. Likewise, the signal B2 is coded in the coding circuit 3 according to occurrence of the available area in the coding memory 5 and data is written into the coding memory 5. Thus, the coding processes for the signals in the areas A and B are sequentially effected substantially in parallel, thereby making it possible to code a large amount of data at a high speed with high efficiency.

As shown in FIG. 3, an image is divided into two regions by a line that crosses the direction of the block processing order. A method of dividing images is significant in this embodiment. When the blocks are processed in the horizontal direction, the image should be divided into plural regions (referred as columns hereinafter) by vertical lines, and when the blocks are processed in the vertical direction, the image should be divided into plural regions (referred as rows hereinafter) by horizontal lines. FIG. 3 illustrates a simple case where the image is divided into two columns. However, the division as described above is also effective even if the image is divided into more columns. To simplify understanding, suppose that the blocks are processed in the horizontal direction from the upper-left to the lower-right. Under this assumption, the column-division is more efficient than the row-division, including mosaic-like division. The reason the division format should be the column-division format is described hereinafter in greater detail.

In the case of dividing the image into two columns by a vertical line as shown in FIG. 3, the data in columns A1 and B1 are processed in parallel. At this time, the coded data corresponding to column A1 are stored in CODE MEMORY 4 (in FIG. 1) and are outputted to CODE OUTPUT CIRCUIT 6; preferably, the coded data corresponding to column A1 are outputted directly in CODE OUTPUT CIRCUIT 6 without being stored in CODE MEMORY 4. The coded data corresponding to column B1 are temporarily stored in CODE MEMORY 5 and are then outputted to CODE OUTPUT CIRCUIT 6 following the data from column A1. In parallel to the output process as described above, the data from columns A2 and B2 are processed simultaneously, and the coded data corresponding to columns A2 and B2 are stored in CODE MEMORY 4 and CODE MEMORY 5, respectively. The same procedure is iterated over the columns. Since the data readout time from the CODE MEMORY 4 (or 5) is relatively short compared with the coding time, this column-division enables to reduce the memory capacity of each CODE MEMORY to a capacity sufficient to store the coded data corresponding to column A1 (or B1, A2, etc.).

On the other hand, in the case of dividing the image into two rows by a horizontal line, the coding for the upper-half part and the coding for the lower-half part can be performed in parallel; however, the coded data for the lower-half part should be stored until all the data from the upper-half part are outputted. Thus, the CODE MEMORY requires a large capacity so as to be able to store the coded data corresponding to half of the image. The same problem arises for processing lower image regions in a mosaic arrangement.

As discussed above, dividing the image by lines that cross the block in processing directions, as shown in FIG. 3, enables an efficient parallel processing with relatively small-scale circuits.

The present invention is also effective for International standards for high-quality moving picture image coding. For example, MPEG2 (Moving Picture Image Coding Experts Group Phase 2) treats image planes with 1920×1152 pixels. In order to process such an image with many pixels in real time, parallel processing is an important technique. Furthermore, because the codes for one image are treated as a single data stream in this MPEG 2 standard, the technique of the present invention is effective to connect the coded bit streams that have been independently produced in plural processors. The present invention enables plural processors to produce codes without redundancy such as stuffing bits for completing a byte data or marker codes for indicating the connections between the codes produced by plural processors.

Thus, the division of images by the lines that cross the block processing direction of the images is effective to encode moving pictures with small-scale circuits as well as to encode still images. When the image is divided by a line in parallel with the block processing direction, the codes for the lower-half part should be stored until the codes for the upper-half have been read out, though the coding for both parts, that is, the upper-half part and the lower-half part, can be finished simultaneously. Therefore, the CODE MEMORY requires a sufficiently large memory capacity in order to store the codes corresponding to the lower-half part of the image. In the case of the International standards for moving picture image coding as well, to divide the image by the lines that cross the blocks processing directions, as shown in FIG. 3, also enables efficient parallel processing with relatively small-scale circuits.

Next, a second embodiment of this invention is explained. In this embodiment, a code amount control operation is effected in addition to the parallel process as described in the first embodiment. Further, the code decoding process is also explained.

Figure 5:
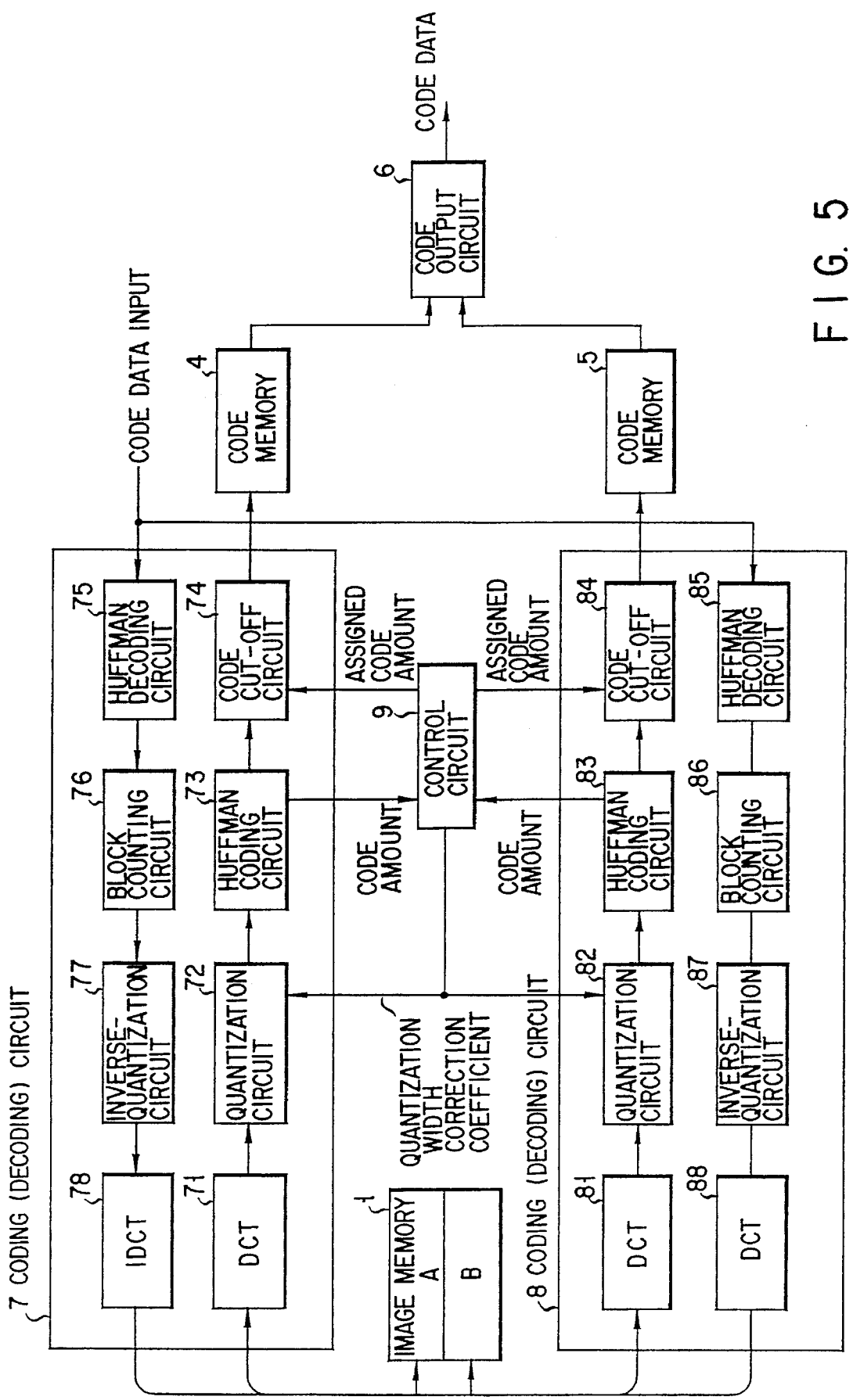
FIG. 5 is a circuit construction diagram of a coding/decoding device according to a second embodiment of this invention.
Figure 8:
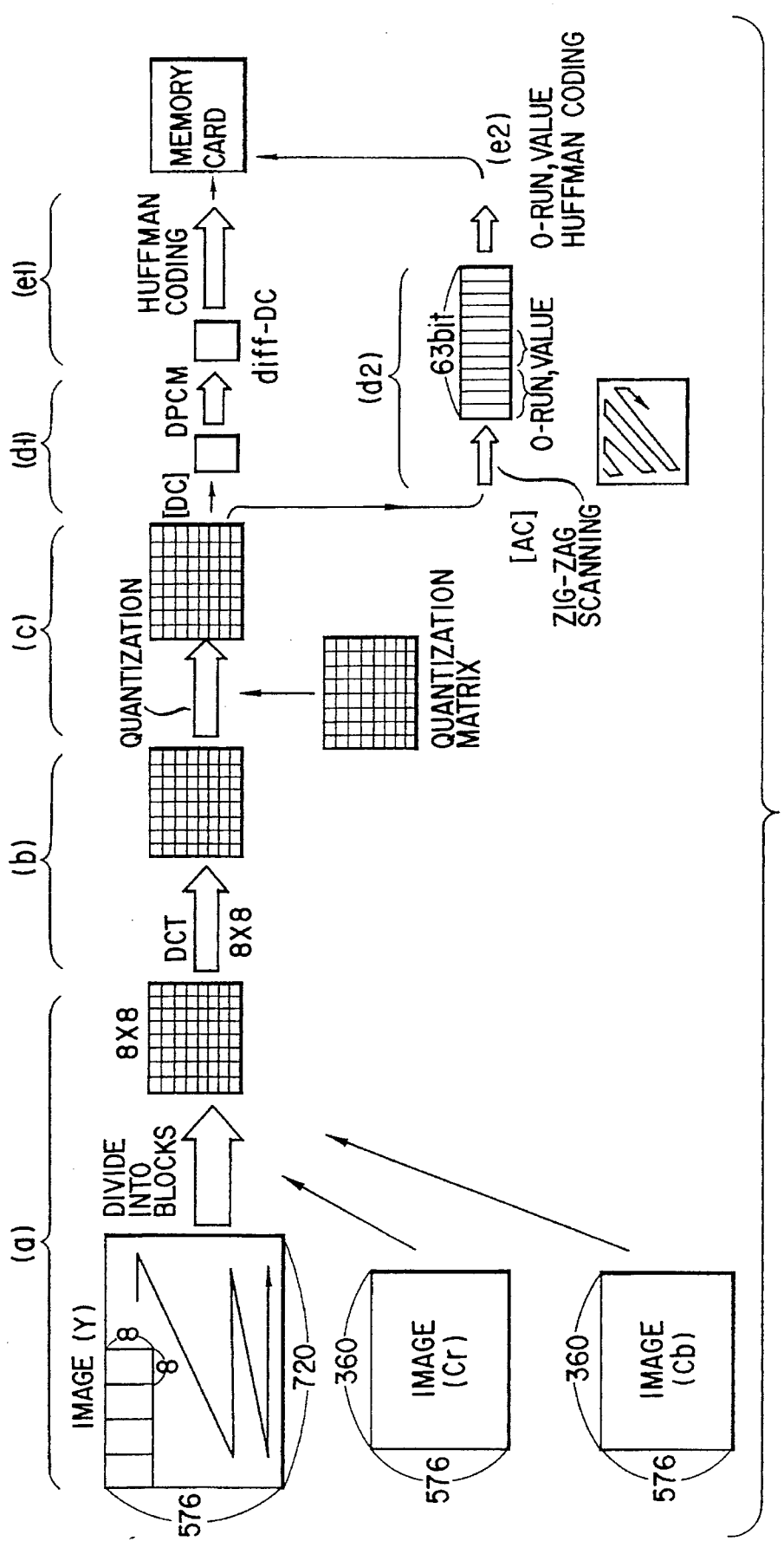
FIG. 8 is an operation transition diagram of the conventional data compression system.

The construction of a coding (decoding) device of this embodiment is shown in FIG. 5. A reference numeral 1 indicates an image memory, 4 and 5 denote code memories, and 6 denotes a code output circuit, and these constituents have the same functions as those denoted by the same reference numerals in the first embodiment. Reference numerals 7 and 8 denote coding (decoding) circuits, and 9 denotes a control circuit. The coding circuits 7 and 8 respectively include DCT circuits 71 and 81, quantizing circuits 72 and 82, Huffman coding circuits 73 and 83, cut-off circuits 74 and 84, Huffman decoding circuit 75 and 85, block counting circuits 76 and 86, inverse-quantizing circuits 77 and 87, and IDCT (inverse-DCT) circuits 78 and 88.

The operation timing of the coding operation of the coding device with the above construction is explained with reference to FIGS. 6A and 6B. In the first pass, signals of the A and B areas are simultaneously and sequentially read out from the image memory 1 for each block and respectively input to the coding circuits 7 and 8 shown in FIG. 5. The input signal A1 is converted into a DCT coefficient by means of the DCT circuit 71. The converted coefficient is quantized by use of a provisional quantization width in the quantizing circuit 72. The quantized value is input to the Huffman coding circuit 73 and the DC and AC components thereof are subjected to the Huffman coding here. A value indicating the code amount for each block caused in this stage is derived and output to the control circuit 9.

In the control circuit 9, the code amount for each block and the code amount of the total number of blocks are derived and stored. The signal B1 is subjected to the same processing in the coding circuit 8 the code amount for each block derived as the result of the above processing is output to the control circuit 9 and the code amount for each block and the code amount of the total number of blocks are stored. As the code amount of the total number of blocks, the values of the areas A and B are added together. The above operation is effected for the signals A2, B2; A3, B3; . . . in parallel for the regions A and B. When the above processing for the entire image is completed, the control circuit 9 predicts an optimum value of the quantization width based on the derived total code amount and a desired code amount. That is, since there is a statistically strong correlation between the quantization width and the code amount, the quantization width is corrected so as to make the code amount closer to the desired code amount according to the correlation. The correction coefficient of the derived quantization width is output from the control circuit 9 to the coding circuits 7 and 8.

Then, the second pass of coding is effected. The signal A1 is read out from the image memory 1 again and input to the coding circuit 7. The input signal is converted into a DCT coefficient in the DCT circuit 71. The converted coefficient is subjected to the linear quantization in the quantizing circuit 72, and in this case, the quantization coefficient which is corrected by the correction coefficient supplied from the control circuit 9 is used for the quantization. The quantized DCT coefficient is input to the Huffman coding circuit 73. Then, a difference between the DC component thereof and the DC component of a preceding block is expressed by a group number and an additional bit and the group number is subjected to the Huffman coding process. The AC component is zig-zag scanned and the zero-run value and the group number of a valid value of the AC component are subjected to the 2-dimensional Huffman coding. Coded data derived together with the additional bit is input to the code cut-off circuit 74 and the assigned code amount for the block is controlled. The code amount assigned to the block can be derived by multiplying the stored code amount generated in the block in the first pass by the ratio of the desired code amount to the total code amount in the first pass in the controlling circuit 9. The thus derived code amount for the block is input to the code cut-off circuit 74 and compared with the code amount of the code data of the block. When the actual code amount is within the assigned code amount, an EOB code is attached to the code data and the code data is output to the code memory 4. In this case, if the 64-th coefficient is not "0", the EOB is removed.

When the actual code amount has exceeded the assigned code amount, the high frequency component is cut off to set the code amount into the assigned code amount range. That is, the code data (Huffman code and an additional bit) within the assigned code amount range is output to the code memory 4 and has an EOB attached thereto. The remaining code data is discarded without being output.

while the above operation is being effected, exactly the same coding operation is effected for the signal B1 in the coding circuit 8 and code data is written into the code memory 5. In the signal readout from the code memories 4 and 5, readout of the signal A1 from the code memory 4 is preferentially effected as explained in the first embodiment. Then, code data items are sequentially read out and supplied to the code output circuit 6 in an order of B1, A2, B2, ... by the same process, and processes such as the marker code insertion, bit stuffing, and byte stuffing are effected to derive final code data. At this time, like the first embodiment, in the code output circuit 6, the code indicating variation in the DC component in the boundary region between the areas A and B is changed from a code corresponding to a difference with respect to "0" to a code corresponding to a difference with respect to the DC component in the preceding block.

As described above, when the code amount control operation is effected in two passes, a completely parallel processing is effected in the first pass, and in the second pass, a parallel processing is effected after the code data items are read out from the code memories 4 and 5, thus making it possible to effect the coding operation at a high speed.

The coding circuits 7 and 8 explained in the above embodiment can be used for an operation which does not include the code amount controlling operation as described in the first embodiment by inhibiting use of the code cut-off function.

Next, the decoding operation of the coding (decoding) device shown in FIG. 5 is explained with reference to FIGS. 7A and 7B. Input code data is also input to the Huffman decoding circuits 75 and 85. In the decoding circuit 7, the Huffman codes are sequentially decoded starting from the head of the data by means of the Huffman decoding circuit 75 and a difference of the quantized DC components and the AC component are detected. The end of the block can be detected by detecting the EOB code or the 64-th coefficient which is not "0". Each time the end of the block appears, the block is counted by the block counter circuit 76 and therefore the number of the block to which the decoded data belongs can be determined. In this case, only data corresponding to the area A can be supplied to the inverse-quantizing circuit 77 in the decoding circuit 7 according to the image division shown in FIG. 3. Then, the restoration of the DC component and the inverse-quantization (conversion to typical values) of the DC and AC components are effected. The typical values are supplied to the IDCT circuit 78, converted into an image signal and written into the area A of the image memory 1. Data for the area B is discarded without being output to the inverse-quantizing circuit 77. Therefore, the processing of data for the area B is only the decoding of the Huffman code and the processing time can be reduced in comparison with a case wherein data is further subjected to the inverse-quantization/IDCT process.

Likewise, in the decoding circuit 8, the Huffman decoding is effected by means of the Huffman decoding circuit 85 and only data for the area B is counted by means of the block counting circuit 86 and selected. After this, the decoding of the DC component and conversion to a typical value are effected in the inverse-quantization circuit 87 and conversion is effected in the IDCT circuit 88, and data thus obtained is written into the area B of the image memory 1. When the above process is effected for the entire image, the decoding process for the entire image is completed. Thus, the process can be effected at a high speed by effecting the decoding process in parallel at the time decoding operation.

As described above, in this invention, the operation speed of the image data compression process can be enhanced by combining a plurality of coding circuits and operating them in parallel.

In the above embodiment, the parallel operation of the two sets of coding circuits is explained, but it is not limited to this example, and three or more coding circuits can be operated in parallel according to the principle of this invention.

Further, the orthogonal transform is not limited to the DCT and may be Fourier transform or Hadamard transform. The variable-length coding may be an arithmetic coding in addition to the Huffman coding.

As described above, according to this invention, image data coding and decoding devices which can encode a large amount of image data in a relatively short processing time can be provided.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. An image data coding apparatus for coding image data, comprising:

image data storing means having a plurality of storage areas for storing image data, said image data being divided into a plurality of image data items in a predetermined direction, and each of said image data items being stored in a corresponding one of said plurality of storage areas;

a plurality of simultaneously operable orthogonal transform means provided in one-to-one correspondence with said plurality of storage areas, each of said plurality of orthogonal transform means including means for reading out a corresponding one of the image data items stored in said plurality of storage areas, with each image data item being divided into a plurality of timewise sequentially occurring blocks, and means for simultaneously subjecting respective blocks of the corresponding image data item to orthogonal transformation;

a plurality of simultaneously operable quantization means provided in one-to-one correspondence with said plurality of storage areas, each of said plurality of quantization means including means for simultaneously quantizing, for each frequency component of a given block, a corresponding one of orthogonal transform outputs supplied from said plurality of orthogonal transform means;

a plurality of simultaneously operable variable length coding means provided in one-to-one correspondence with said plurality of storage areas, each of said plurality of variable length coding means including means for calculating a difference between one of the frequency components of said given block and a corresponding frequency component of a timewise preceding block and for simultaneously subjecting a corresponding one of quantized outputs from said plurality of quantization means to variable length coding processing;

a plurality of memory means, each for storing a corresponding one of outputs of said plurality of variable length coding means in a bit-series configuration; and output means including means for sequentially reading out bit-series data items stored in said plurality of memory means, the bit-series data items corresponding to said image data items, means for connecting the readout data items together, and means for outputting data for each byte; and wherein the blocks included in each image data item are sequentially subjected to orthorgonal transformation, quantization, and variable length coding along a direction perpendicular to the predetermined direction.

2. An image data coding apparatus according to claim 1, wherein each of said plurality of orthogonal transform means includes a plurality of DCT (discrete cosine transform) circuits.

3. An image data coding apparatus according to claim 1, wherein each of said variable length coding means includes a Huffman coding circuit means.

4. A coding apparatus according to claim 1, wherein:

said image data storing means stores one-frame image data; and each one-frame image data is divided into a plurality of blocks, each block having the same size.

5. An image data coding apparatus for coding image data, comprising:

a plurality of code amount deriving means each for deriving an amount of code by quantizing with a provisional quantization width and coding the image data;

quantization width predicting means for predicting an optimum quantization width based on the code amount derived by said plurality of code amount deriving means;

image data storing means having a plurality of storage areas for storing image data, said image data being divided into a plurality of image data items in a predetermined direction, and each of said image data items being stored in a corresponding one of said plurality of storage areas;

a plurality of simultaneously operable orthogonal transform means provided in one-to-one correspondence with said plurality of storage areas, each of said plurality of orthogonal transform means including means for reading out a corresponding one of the image data items stored in said plurality of storage areas, with each image data item being divided into a plurality of timewise sequentially occurring blocks, and means for simultaneously subjecting respective blocks of the corresponding image data item to orthogonal transformation;

a plurality of simultaneously operable quantization means provided in one-to-one correspondence with said plurality of storage areas, each of said plurality of quantization means including means for simultaneously quantizing, for each frequency component of a given block, a corresponding one of orthogonal transform outputs supplied from said plurality of orthogonal transform means;

a plurality of simultaneously operable variable length coding means provided in one-to-one correspondence with said plurality of storage areas, each of said plurality of variable length coding means including means for calculating a difference between one of the frequency components of said given block and a corresponding frequency component of a timewise preceding block and for simultaneously subjecting a corresponding one of quantized outputs from said plurality of quantization means to variable length coding processing;

a plurality of memory means, each for storing a corresponding one of outputs from said plurality of variable length coding means in a bit-series configuration; and output means including means for sequentially reading out bit-series data items stored in said plurality of memory means, said bit-series data items corresponding to said image data items, means for connecting the readout data items together, and means for outputting data for each byte; and wherein the blocks included in each image data item are sequentially subjected to orthogonal transformation, quantization, and variable length coding along a direction perpendicular to the predetermined direction.

6. An image data coding apparatus according to claim 9, further comprising circuit means for cutting-off a coding operation when a code amount from said plurality of variable length coding means has exceeded an assigned code amount.

7. An image data coding apparatus according to claim 9, wherein each of said plurality of orthogonal transform means includes a plurality of DCT (discrete cosine transform) circuits.

8. An image data coding apparatus according to claim 9, wherein each of said variable length coding means includes a Huffman coding circuit means.

9. A coding apparatus according to claim 5, wherein:

said image data storing means stores one-frame image data; and each one-frame image data is divided into a plurality of blocks, each block having the same size.

10. An image data coding method comprising the steps of:

storing image data in an image data storing means having a plurality of storage areas, said image data being divided into a plurality of image data items in a predetermined direction, and each of said image data items being stored in a corresponding one of said plurality of storage areas;

reading out the image data items from said image data storing means, with each image data item being divided into a plurality of timewise sequentially occurring blocks, and simultaneously subjecting each of the readout image data items to orthogonal transformation in units of blocks, by use of a corresponding one of a plurality of orthogonal transform means;

simultaneously quantizing, for each frequency component of a given block, each of the orthogonal transform outputs from said plurality of orthogonal transform means by use of a corresponding one of a plurality of quantization means;

simultaneously subjecting each of the quantized outputs from said plurality of quantization means to variable length coding processing by use of a corresponding one of a plurality of variable length coding means, said variable length coding processing including calculating a difference between one of the frequency components of said given block and a corresponding frequency component of a timewise preceding block;

storing each of outputs from said plurality of variable length coding means into a corresponding one of a plurality of memory means in a bit-series configuration; and sequentially reading out bit-series data items stored in said plurality of memory means, said bit-series data items corresponding to said image data items, connecting the readout data items together, and outputting data for each byte; and wherein the blocks included in each image data item are sequentially subjected to orthogonal transformation, quantization, and variable length coding along a direction perpendicular to the predetermined direction.

11. A coding method according to claim 10, wherein:

said image data storing means stores one-frame image data;

each one-frame image data is divided into a plurality of blocks, each block having the same size.

* * * * *

UNITED STATES PATENT AND TRADEMARK OFFICE
CERTIFICATE OF CORRECTION

PATENT NO.   : 5,568,278
DATED        : October 22, 1996
INVENTOR(S)  : Keiichi NAKANO et al.

It is certified that error appears in the above-indentified patent and that said Letters Patent is hereby corrected as shown below:

Title Page, Item [54], and in column 1, in the Title, delete "AND DECODING".

Title Page, Item [56], References Cited, after "U.S. PATENT DOCUMENTS" insert:

--4,772,956   9/1988   Roche et al. --.

Signed and Sealed this

Eighth Day of April, 1997

Attest:

BRUCE LEHMAN

Attesting Officer   Commissioner of Patents and Trademarks